3,845,108
TRANS-7-CIS-9-DODECADIEN-1-YL ACETATE
Wendell Roelofs, 652 W. North St.; Jan Kochansky, R.D. 2, Hastings Road; and Ring Cardé, New York State A. Exp. Sta., all of Geneva, N.Y. 14456
No Drawing. Filed Aug. 31, 1973, Ser. No. 393,360
Int. Cl. C07c 69/14
U.S. Cl. 260—488 H         2 Claims

ABSTRACT OF THE DISCLOSURE

Trans-7-cis-9-dodecadien-1-yl acetate has been synthesized and found to be a sex attractant for males of the species Lobesia botrana (European grape vine moth), a major pest of the vine. Methods of preparing trans-7-cis-9-dodecadien-1-yl acetate and a method of utilizing said compound as attracting agent are disclosed.

FIELD OF THE INVENTION

Novel insect sex attractants.

RELATED APPLICATIONS

None.

DESCRIPTION OF THE PRIOR ART

In recent years, the ecological problems raised by the widespread use of certain insecticides, in particular halogenated aromatics such as DDT, have initiated the search for more specific methods of destroying insect pests, which, if they do not entirely eliminate the use of such harmful insecticides as pesticides, at least considerably cut down the area in which they are broadcast. One mode which has been found of great interest in recent years has been the use of sex attractants or pheromones to attract either the male or the female of a particular species or a number of species to a particular and small location where they can be destroyed thereby interrupting the breeding cycle and cutting down the number of such pests in the next season. One technique employed for this purpose is to isolate either the male or the female pheromone and insert it into an insect trap which is then located in the area which it is desired to protect from a particular species of moth or other insect. The vapor from the trap attracts the inserts into the trap where they are either held or killed, thus removing them from the general populace. Two problems have been associated with this approach. The first problem is that of availability. Enormous numbers of laboratory reared inserts are required to produce the naturally occurring attractant. This clearly is not a commercially feasible approach and therefore the nature of attractants must be determined and such compounds prepared synthetically.

SUMMARY OF THE INVENTION

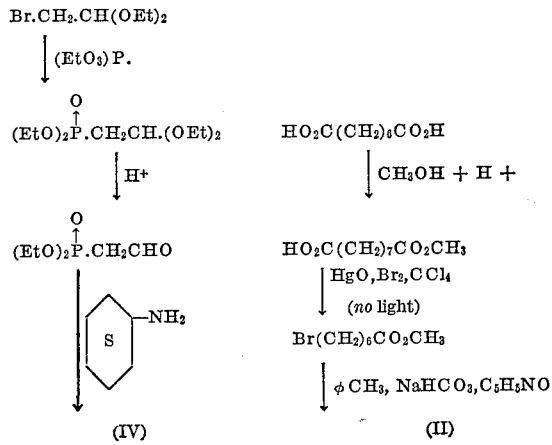

(I)

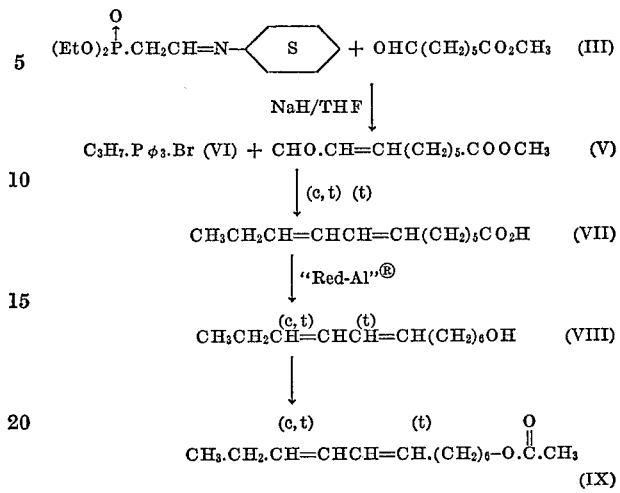

A male attracting compound which is active towards males of the species Lobesia botrana namely trans-7-cis-9-dodecadien-1-yl acetate has been synthesized, and found active in both in vitro and in vivo tests.

The grape berry moth Lobesia (Polychrosis) botrana is an extremely serious pest of the vine in Europe and therefore the finding of a male attractant compound for this insect is of great utility in providing ecologically desirable methods of reducing the population of this insect without the necessity of large scale spraying which is required at the present time.

DESCRIPTION OF THE PREFERRED EMBODIMENTS

A route is disclosed for the synthesis of trans-7-cis-9-dodecadien-1-yl acetate.

In the preparation of trans-7-cis-9-dodecadien-1-yl acetate (IX), a monoalkyl ester of suberic acid, suitably the methyl ester (I) is prepared by esterifying suberic acid with the appropriate alkanol, suitably a lower alkanol such as methanol. The ester (I) is converted to an alkyl-7-bromoheptanoate, by a Hunsdiecker reaction, or, preferably, by the action of bromine in the presence of red mercuric oxide in the absence of light. The action of an appropriate oxidizing agent in the presence of a mild base upon the alkyl 7-bromoheptanoate (II), suitably pyridine-N-oxide in the presence of sodium bicarbonate yields the corresponding alkyl 7-oxoheptanoate (III).

Compound (III) is then treated with diethyl-2-(cyclohexylamino) ethane phosphonate (IV). Compound (IV) is prepared by the method of Nagata and Hayase (J. Chem. Soc., © 1969, 460) utilizing diethyl formylmethane phosphonate, prepared by the method of Dawson and Burger [JACS, 74, 5312 (1952)], as starting material.

The iminophosphonate (IV) and the ester (III) are reacted in the presence of sodium hydride in tetrahydrofuran to yield the alkyl 9-oxooct-7-enoate (V). Reaction of propyltriphenylphosphonium bromide (VI) (prepared from propylbromide and triphenylphosphine) with the alkyl 9-oxooct-7-enoate (V) followed by saponification yields trans-7-cis, trans-9-dodecadienoic acid (VII). The acid (VI) is then reduced to the corresponding alcohol (VIII), suitably by means of an organometallic reducing agent such as lithium aluminum hydride or sodium dihydro-bis-(2-methoxy ethoxy) aluminate ("Red-Al®"), yielding trans-7-cis, trans-9-dodecadien-1-ol (VIII) which is esterified to the desired trans-7-cis, trans-9-dodecadien-1-yl acetate (IX) by treatment with an acetylating agent such as acetic anhydride in pyridine.

Product (IX) is then purified by preparative gas liquid chromatography to yield a mixture of trans-7-trans-9-dodecadienyl and trans-7-cis-9-dodecadienyl acetates containing at least 80% of the said trans/cis isomer. Since the trans/trans isomer has no substantial repulsive or attractive effect, its presence in the mixture is commercially acceptable.

The biological efficacy of the synthetic material was tested both by field test and by electro-antennograms. The electro-antennograms were run by a modification of the method and apparatus of Schnieder (First Int. Symp. on Olfaction and Taste, Oxford (1963), p. 85). In this test, antennae of the insect which had been prepared in the method described by Schnieder and had been attached to an oscilloscope, were exposed to an air stream into which were injected 1 ml. puffs passing over a piece of filter paper saturated with a small amount of the chemical material under test. The electrical responses of the antennae were measured on the oscilloscope. The method is described in detail in British Pat. No. 1,299,691 to Roelofs et al. Typical upwind orientation toward the odor source observed with femal extracts were elicited by the synthetic chemical. Male orientation was still quantitive with 100 picograms. Quantitative excitation was elicited with 10 pg., although there was little orientation.

In the field tests, Sectar® insect traps (3M Company) were charged with the material under test and hung in fields where the moth was prevalent.

The attractant substance may be used *per se*. In order to obtain more accurate dispensing of the attractant it may be taken up in a suitable volatile diluent. Any reaction inert volatile organic solvent may be employed. Lower alkanols such as methanol or ethanol ethers, such as diethyl ether, halogenated hydrocarbons such as methylene chloride and alkyl ketones such as acetone or the like may be employed.

These solvents will evaporate very rapidly leaving the attractant in the trap which may then volatilize slowly.

The rate of volatilization may be reduced by dissolving the attractant in a substantially non-odorous reaction inert viscous liquid. The nature of this viscous liquid is not critical, however, olive oil has been found suitable as an attractant keeper as has glycerol trioctanoate, mineral oil and Nujol®. The use of such keepers permits the raising of dosage per trap to about 10,000 μg. This permits the traps to be active for a longer time without creating the repulsant effect noted with high concentrations of sex attractants.

It will be seen therefore that the preparation of compositions of the attractant, a keeper, and a diluent is most desirable. The concentration of the components is not critical as the determining factor is the amount dispensed per trap. Thus, where a 1 ml. sample comprising 10 mg. is to be dispensed per trap a suitable composition would be as follows:

Trans-7-cis-9-dodecadien-1-yl acetate _____ g__ 10
Olive oil _____ ml__ 100
Ethanol _____ ml__ 900

EXAMPLE I

Monomethyl ester of suberic acid (I)

Suberic acid (348.2 g., 2 moles; Eastman technical grade), methanol (120 ml.), and concentrated hydrochloric acid (120 ml., 36%) were mixed and refluxed overnight. Distillation under reduced pressure removed unreacted methanol and aqueous acid, then dimethyl suberate (b.p. 120° at 6 mm. Hg) and finally monomethyl suberate (I); 140–150°/0.1 mm. In accordance with the foregoing procedure but where in place of methanol there is used ethanol, propanol or butanol, there is obtained the corresponding ethyl, propyl or butyl suberate.

EXAMPLE II

Methyl-7-bromoheptanoate (II)

Monomethyl suberate (55.8 g., 0.30 moles), red mercuric oxide (120 g., 0.55 moles), and carbon tetrachloride (1 l.) were mixed and heated to reflux. The reaction flask was wrapped to exclude light, and bromine (72 g., 0.45 moles) in carbon tetrachloride (350 ml.) was added slowly. The mixture was refluxed and stirred for 2 hours, then filtered and evaporated. To remove residues of mercury salts, the filtrate was extracted with several portions each of distilled water, dilute nitric acid, and again distilled water. Filtration of the organic layer through a pledget of anhydrous magnesium sulfate and evaporation of filtrate produced a material of satisfactory purity for the next reaction. IR, 1745 cm.$^{-1}$, GLC one major peak and several minor ones comprising a total of *ca* 5% of the mixture.

In accordance with the foregoing procedure but where, in place of methyl suberate, there is used ethyl, propyl or butyl suberate, there is correspondingly produced ethyl, propyl or butyl 7-bromoheptanoate.

EXAMPLE III

Methyl-7-oxoheptanoate (III)

Methyl 7-bromoheptanoate (23 g., 103 moles), pyridine-N-oxide (20 g., 210 mmoles), sodium bicarbonate (18 g., 212 mmoles) and toluene (250 ml.) were mixed, heated to vapour temperature of 110° to azeotrope out water, then refluxed under nitrogen for 4 hours. The mixture was cooled and poured into iced water (500 ml.). The organic layer was separated and the aqueous phase was extracted twice with petroleum ether (30–60°). The combined organic layers were evaporated and the residue was distilled to yield 18.5 g. of product, containing *ca* 50% methyl 7-oxoheptanoate (III) by gas liquid chromatography. The product was reprocessed, treating it as starting material to yield a substantially pure methyl 7-oxoheptanoate.

EXAMPLE IV

Methyl 9-oxooct-7-enoate (V)

Diethyl 2-(cyclohexylimino) ethane phosphonate (V) (6 g.) in tetrahydrofuran (75 ml.) is added to an ice cooled suspension of sodium hydride in tetrahydrofuran under an atmosphere of nitrogen. The sodium hydride suspension is freshly prepared by washing a sodium hydride/mineral oil suspension (1.25 g., 57%) three times with tetrahydrofuran (25 ml.) and discarding the first 2 washes thereby removing the mineral oil. The mixture is stirred for 15 minutes. Methyl 7-oxoheptanoate (III) (4.2 g., 26 mmol) in tetrahydrofuran (25 ml.) is added and the mixture stirred at 25° for 2 hours. The reaction mixture is quenched by pouring into water and extracted with petroleum ether (Skellysolve® B). The extracts are washed with saturated aqueous sodium chloride, the solvent removed under reduced pressure and the residue dissolved in benzene (100 ml.). To the benzene solution is added oxalic acid (400 ml., 1% aq.) and the mixture stirred at 25° for 48 hours in an nitrogen atmosphere. The benzene layer is separated and dried over magnesium sulfate. Evaporation of the solvent yields methyl 9-oxooct-7-enoate (V) which is used without purification in the next step.

EXAMPLE V

Propyltriphenylphosphonium bromide (VI)

n-Propyl bromide (10.2 g., 0.083 moles); triphenyl phosphine (23 g., 0.088 moles); and benzene (60 ml.) were mixed and refluxed under nitrogen overnight. The mixture was cooled and filtered. The solids were washed on the filter with benzene and diethyl ether, then dried under vacuum over phosphorus pentoxide, to yield propyltriphenyl phosphonium bromide (VI) (8.7 g., 27%)

which was used without further purification. Further refluxing of the filtrate gave additional material.

EXAMPLE VI

Trans-7-cis,trans-9-dodecanoic acid (VII)

Sodium amide is freshly prepared by dissolving metallic sodium (750 mg.) in liquid ammonia (300 ml.) (FeCl$_3$, N$_2$ atmosphere). Propyltriphenylphosphonium bromide (VI) (10.5 g.) prepared in accordance with Example V is added and stirred vigorously while the ammonia is evaporated. Evaporation is continued over approximately 4 hours, the last traces being removed by immersion of flask in warm water. Benzene (150 ml.) is added and the mixture refluxed for 30 minutes, and cooled. The benzene solution of methyl 9-oxooct-7-enoate (V) prepared in accordance with Example IV (supra) is then added over a period of 2 hours under a nitrogen atmosphere. Stirring is continued at 25° for a further hour. The reaction mixture is quenched by pouring into water and the solvent layer washed thoroughly with water. The solvent is then removed under reduced pressure on a rotary evaporator and the residue saponified by heating under reflux with ethanolic potassium hydroxide (9:1, 50 ml.) for 2 hours. The mixture is again quenched by pouring into water and extracted sequentially with petroleum ether (Skellysolve® B) and benzene. The organic extracts are discarded and the aqueous layer acidified with aqueous hydrochloric acid, and extracted with benzene. The benzene extract is washed with water, dried over magnesium sulfate, and the solvent removed under reduced pressure to yield trans-7-cis,trans-9-dodecanoic acid (VII) which is used without further work-up in the next stage.

EXAMPLE VII

Trans-7-cis,trans-9-dodecadien-1-ol (VIII)

"Red-Al®" (10 g., 35 mmoles); being a 70% solution in benzene of sodium dihydro-bis-(2-methoxy ethoxy) aluminate, is placed in a flask under nitrogen. Trans-7-cis,trans-9-dodecadienoic acid (VII) (from example VI) in benzene (50 ml.) is added slowly. The mixture is heated under reflux for 1 hour, cooled, 10% sodium hydroxide (100 ml.) added dropwise under nitrogen and extracted three times with petroleum ether (30–60%). The combined extracts are washed with aqueous sodium chloride until neutral, filtered through anhydrous magnesium sulfate and evaporated to yield crude trans-7-cis, trans-9-dodecadien-1-ol.

EXAMPLE VIII

Trans-7-cis,trans-9-dodecadien-1-yl acetate (IX)

The crude alcohol (VIII) produced in accordance with the previous example is taken up in a mixture of acidic anhydride in pyridine (10 ml.+10 ml.) and heated for 45 minutes on a steam bath. The crude reaction mixture is quenched by pouring into water and extracting with petroleum ether. The organic extract is then further washed successively with water, ice cold aqueous hydrochloric acid (10%), saturated aqueous sodium bicarbonate, and saturated aqueous sodium chloride. The extract is dried over magnesium sulfate and the solvent removed under reduced pressure to yield trans-7-cis,trans-9-dodecadien-1-ol acetate (IX) (1.8 g., 30% from III, about 70% pure).

The thus prepared crude trans-7-cis,trans-9-dodecadien-1-yl aceate contains undesirable low boiling fractions which are removed by preparative gas liquid chromatography (3% phenyl diethanolamine succinate (PDEAS) on 60/80 mesh Gas chrom Z® at 120°).

The product from the preparative scale chromatography is sufficiently pure for attractant use. Rechromatography on an analytical scale column (3% PDEAS) on 100/120 chromosorb W®, 150°, nitrogen at 40 ml./min. gave the trans-7-cis-9-isomer at 8.75 mins. and the trans-7-trans 9 isomer in 9.7 mins. (ratio 9:1).

IR (film) of trans-7-cis-9-dodecadien-1-yl acetate fraction (from GLC) shown $\lambda_{max}$. 3350, 2980, 2950, 2870, 1700, 1245, 990 and 956 cm.$^{-1}$.

If (film) of trans-7-trans-9-dodecadien-1-yl acetate (from GLC) showed $\lambda_{max}$. 2980, 2950, 2870, 1700, 1245, 996 cm.$^{-1}$.

FIELD TESTS

The tests were carried out by placing measured amounts of attractant containing at least 80% by weight of the given amount of cis-9-trans-7-dodecadien-1-yl acetate in the traps.

The results are summarized below.

TABLE 1

[*L. botrana* trapping with trans-7, cis-9-dodecadien-1-yl acetate and virgin females]

| Carried [1] | Attractant, mg. | Mean number males/trap [2] | |
|---|---|---|---|
| | | Wild [3] | Released [4] |
| Polyethylene cap, large | 5 | 4.3 | de |
| | 1 | 8.0 | bc |
| | 0.2 | 10.0 | b |
| | 0.05 | 5.8 | cde |
| | 0.01 | 3.0 | ef |
| | 0 | 0 | f |
| Polyethylene cap, small | 1 | 5.5 | cde |
| | 0.1 | 12.8 | a | 22.4 g. |
| | 0.01 | 3.3 | e | |
| Rubber septum | 0.1 | 10.8 | ab |
| | 0.01 | 6.3 | cd |
| | ([5]) | 2.8 | ef | 3.0 h. |

[1] Large polyethylene cap and rubber septum as described in Roelofs, et al., Envir. Ent. 2:25B (1973). The small polyethylene cap is 10 mm. dia. with an 8.5 mm. dia. cap inserted as cover (Semadeni and Co., Bern).
[2] Means followed by the same letter are not significantly different at the 5% level.
[3] Wild males trapped during first flight May 17–June 3, 1973 at Stafa ZH; treatments replicated 4 times and sampled and rotated 8 times.
[4] Trapping of released laboratory-reared males May 28–30, 1973 at Wadenswil, treatments replicated 5 times.
[5] Five virgin females.

What is claimed is:

1. A mixture of trans-7-cis-9-dodecadien-1-yl acetate and trans-7-trans-9-dodecadien-1-yl acetate.
2. The compound trans-7-cis-9-dodecadien-1-yl acetate.

References Cited

UNITED STATES PATENTS 2,669,579    2/1954    Urban _____ 260—488 H

OTHER REFERENCES

Chem. Abstracts, 77:110559m.
Chem. Abstracts, 76:42111m.
Chem. Abstracts, 77:113750c.
Chem. Abstracts, 41:7657b.

VIVIAN GARNER, Primary Examiner

U.S. Cl. X.R.

260—410.9 R, 413, 483, 487, 632 R, 638 R; 424—84